(12) United States Patent
Sable et al.

(10) Patent No.: US 10,264,332 B1
(45) Date of Patent: Apr. 16, 2019

(54) APPARATUS, SYSTEM, AND METHOD FOR INDICATING STATUSES OF MULTI-LINK NETWORK PORTS

(71) Applicant: Juniper Networks, Inc., Sunnyvale, CA (US)

(72) Inventors: Rajeshwar Sheshrao Sable, Bengaluru (IN); Chandrashekhar Kalyanaraman, Bangalore (IN); Radhakrishna Kodial, Bangalore (IN); Murugan Balabaskaran, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 103 days.

(21) Appl. No.: 15/640,496

(22) Filed: Jul. 1, 2017

(51) Int. Cl.
*H04Q 1/24* (2006.01)
*H04L 12/24* (2006.01)

(52) U.S. Cl.
CPC ........... *H04Q 1/24* (2013.01); *H04L 41/0686* (2013.01)

(58) Field of Classification Search
CPC . G08B 5/36; G08B 5/38; G08B 17/00; G08B 17/06; G08B 5/004; G08B 3/10; G08B 7/06; G08B 17/113; G08B 21/18; G08B 25/04; G08B 5/002
USPC .................................................. 340/815.45
See application file for complete search history.

(56) References Cited

U.S. PATENT DOCUMENTS

| 7,312,715 | B2 * | 12/2007 | Shalts ...................... H04Q 1/06 29/593 |
| 7,712,130 | B2 * | 5/2010 | Reamer ............... H04L 63/0407 726/11 |
| 7,986,228 | B2 * | 7/2011 | Friar ...................... G08B 25/08 340/506 |
| 8,365,018 | B2 * | 1/2013 | McIntosh ............ H04L 41/0672 709/224 |

OTHER PUBLICATIONS

Deepak Kushwaha et al.; Apparatus, System, and Method for Accelerating Security Inspections Using Inline Pattern Matching; U.S. Appl. No. 15/400,922, filed Jan. 6, 2017.
Wikipedia—QSFP; https://en.wikipedia.org/wiki/QSFP.

* cited by examiner

*Primary Examiner* — Mark S Blouin
(74) *Attorney, Agent, or Firm* — FisherBroyles, LLP

(57) ABSTRACT

The disclosed apparatus may include (1) a panel coupled to a network device that includes multiple network ports that each facilitate one or more network links, the panel including (A) an array of port-status indicators that each represent a status of one of the network ports on the network device and (B) an array of link-status indicators that are each dynamically assigned to represent a status of one of the network links and (2) a physical processing device communicatively coupled to the arrays of port-status indicators and link-status indicators, wherein the physical processing device (A) identifies a link-status indicator that has been dynamically assigned to a specific network link, (B) identifies a port-status indicator that corresponds to a specific network port that facilitates the specific network link, and (Continued)

(C) directs the port-status indicator and the link-status indicator to visually indicate whether the specific network link is functional or non-functional.

20 Claims, 8 Drawing Sheets

APPARATUS, SYSTEM, AND METHOD FOR INDICATING STATUSES OF MULTI-LINK NETWORK PORTS

BACKGROUND

Network devices are increasingly able to accommodate and/or facilitate large numbers of network links. For example, a network device (or a network interface card and/or module within the network device) may include several dozen network ports, each of which may facilitate multiple network links via the use of multi-link optical transceivers. Many network devices may indicate the health or status of each link within the devices using visual status indicators corresponding to each link. For example, a conventional network device may indicate the status of its network links via an array of Light-Emitting Diodes (LEDs) that each represent a different link. Users may determine whether a particular network link on the device is functional or broken based on the current state (e.g., color) of the corresponding LED.

Unfortunately, such systems may be impractical and/or infeasible for network devices that facilitate large numbers of network links. For example, the physical enclosure of a multi-link network device may be unable to house a sufficient number of indicators to represent each individual network link. Moreover, even if a network device is physically large enough to display an indicator for each network link, deciphering the status of a particular network link based on an extensive array of LEDs may be inefficient, confusing, and/or difficult for many users.

The instant disclosure, therefore, identifies and addresses a need for improved apparatuses, systems, and methods for indicating statuses of multi-link network ports.

SUMMARY

As will be described in greater detail below, the instant disclosure generally relates to apparatuses, systems, and methods for indicating statuses of multi-link network ports. In one example, an apparatus for accomplishing such a task may include (1) a panel coupled to a network device that includes multiple network ports that each facilitate one or more network links between the network device and one or more remote devices, the panel including (A) an array of port-status indicators that each represent a status of one of the network ports on the network device and (B) an array of link-status indicators that are each dynamically assigned to represent a status of one of the network links and (2) at least one physical processing device communicatively coupled to the arrays of port-status indicators and link-status indicators, wherein the physical processing device (A) identifies, within the array of link-status indicators, a link-status indicator that has been dynamically assigned to a specific network link, (B) identifies, within the array of port-status indicators, a port-status indicator that corresponds to a specific network port that facilitates the specific network link, and then (C) directs the port-status indicator and the link-status indicator to visually indicate whether the specific network link is functional or non-functional.

Similarly, a network device incorporating the above-described apparatus may include (1) a panel that includes multiple network ports that each facilitate one or more network links between the network device and one or more remote devices, the panel including (A) an array of port-status indicators that each represent a status of one of the network ports on the network device and (B) an array of link-status indicators that are each dynamically assigned to represent a status of one of the network links and (2) at least one physical processing device communicatively coupled to the arrays of port-status indicators and link-status indicators, wherein the physical processing device (A) identifies, within the array of link-status indicators, a link-status indicator that has been dynamically assigned to a specific network link, (B) identifies, within the array of port-status indicators, a port-status indicator that corresponds to a specific network port that facilitates the specific network link, and then (C) directs the port-status indicator and the link-status indicator to visually indicate whether the specific network link is functional or non-functional.

A corresponding method may include (1) arranging an array of port-status indicators along a panel of a network device to enable each port-status indicator to represent a status of one of multiple network ports included on the network device, each network port facilitating one or more network links between the network device and one or more remote devices, (2) arranging an array of link-status indicators along the panel of the network device to enable each link-status indicator to be dynamically assigned to represent a status of one of the network links, and (3) communicatively coupling a physical processing device to the arrays of port-status indicators and link-status indicators to facilitate indicating a status of a specific network link by (A) identifying, within the array of link-status indicators, a link-status indicator that has been dynamically assigned to the specific network link, (B) identifying, within the array of port-status indicators, a port-status indicator that corresponds to a specific network port that facilitates the specific network link, and then (C) directing the port-status indicator and the link-status indicator to visually indicate whether the specific network link is functional or non-functional.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
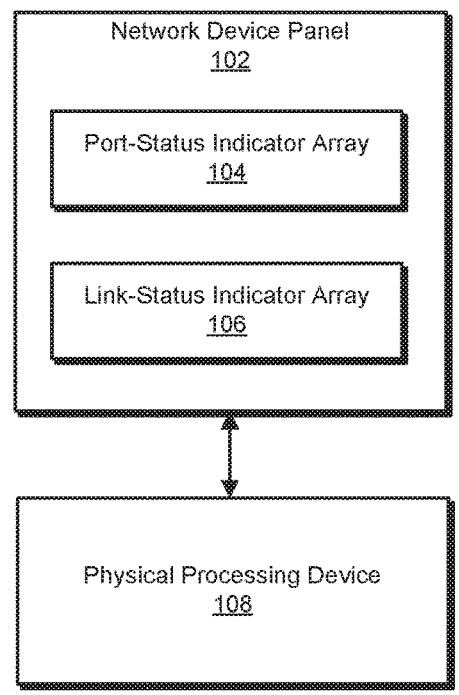
FIG. 1 is a block diagram of an exemplary apparatus for indicating statuses of multi-link network ports.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for indicating statuses of multi-link network ports. As will be explained in greater detail below, embodiments of the instant disclosure may visually indicate the status of all or a portion of the network links facilitated by network ports on a network device. In particular, these embodiments may represent each network port on a network device with a visual status indicator on the network device. These embodiments may then indicate the status of network links facilitated by a network port by using additional indicators that correspond to the network port and have been dynamically assigned to represent the network links of that network port. In this way, these embodiments may indicate the status of each network link facilitated by a network device using significantly fewer indicators than traditional indicator configurations.

Figure 2:
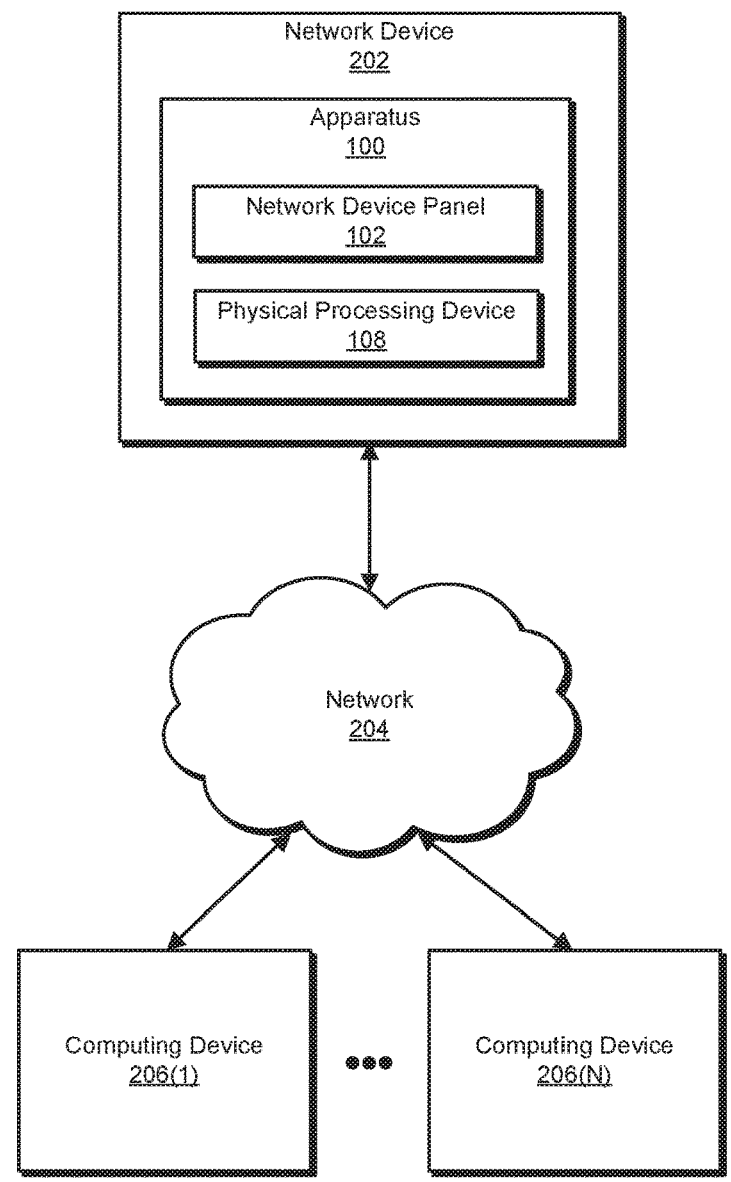
FIG. 2 is a block diagram of an exemplary implementation of an apparatus for indicating statuses of multi-link network ports.

The following will provide, with reference to FIGS. 1 and 2, examples of apparatuses and/or corresponding implementations for indicating statuses of multi-link network ports. Detailed descriptions of exemplary network device panels and exemplary configurations of network device panels will be provided in connection with FIGS. 3-6. Detailed descriptions of an exemplary method for indicating statuses of multi-link network ports will be provided in connection with FIG. 7. Finally, the discussion corresponding to FIG. 8 will provide numerous examples of systems that may include the apparatuses and/or components shown in FIGS. 1 and 2.

FIG. 1 is a block diagram of an exemplary apparatus 100 for indicating statuses of multi-link network ports. In one example, apparatus 100 may include and/or represent any hardware and/or software component of a network device that is dedicated to indicating the status, health, and/or operational mode of one or more network links facilitated by the network device. The term "network device," as used herein, generally refers to any computing device capable of routing network traffic (e.g., optical signals, network packets, wireless signals, and/or wired signals) to and/or from one or more other devices. Examples of network devices include, without limitation, optical transceivers, routers, switches, hubs, modems, bridges, repeaters, gateways, load balancers, multiplexer, network adapters, servers, client devices, portions of one or more of the same, variations or combinations of one or more of the same, and/or any other suitable network device.

In one embodiment, a network device may facilitate network traffic via one or more network ports on the network device. The term "network port," as used herein, generally refers to any communication endpoint on a network device. In one example, a network port may represent a physical outlet and/or interface by which a network device may transfer network traffic via one or more cables, wires, etc. Additionally or alternatively, a network port may represent a software-defined construct and/or destination. A network device may include any number of network ports (e.g., 16 network ports, 24 network ports, etc.). In some examples, a network port may facilitate or operate one or more network links.

The term "network link," as used herein, generally refers to any individual communication channel that is operational within, through, and/or by way of a network port. In some embodiments, a network port may send and/or receive multiple instances of the same data or signal through multiple network links that connect the network port to various remote devices (e.g., via breakout cables). A network port may facilitate any number of network links (e.g., 1, 2, or 4 network links). In one example, each network port included on a network device may facilitate the same number of network links (e.g., each network port on a network device may facilitate one 10 Gigabit Ethernet (GbE) network link). In other examples, a network device may include network ports that facilitate varying numbers of network links (e.g., a network device may include both network ports that facilitate four 10 GbE network links and network ports that facilitate one 40 GbE network link).

As illustrated in FIG. 1, apparatus 100 may include one or more network device panels, such as network device panel 102. Network device panel 102 generally represents any type or form of cover, enclosure, housing, and/or component that is coupled to or secured to a network device. In particular, network device panel 102 may represent any physical element of a network device that is capable of visually displaying, to a user of the network device, the status of one or more network links facilitated by the network device. In some examples, network device panel 102 may include one or more arrays of indicators, such as port-status indicator array 104 and link-status indicator array 106.

The term "indicator," as used herein, generally refers to any physical element that, in combination with one or more additional indicators, visually indicates whether a specific network link is functional (e.g., currently capable of receiving and/or forwarding network traffic) or non-functional (e.g., broken, disabled, etc.). In some examples, an indicator may operate in various modes that each correspond to a different status of a network link. In an exemplary embodiment, an indicator may represent or include one or more LEDs. These LEDs may be configured to display light in a particular color (e.g., green) to indicate that a network link is functional, and to display light in another color (e.g., red) when the network link is non-functional. In addition, the LEDs may be configured to flash (e.g., periodically turn on and off), remain on, and/or remain off to identify or indicate a particular network link or network port (as will be explained in greater detail below).

Port-status indicator array 104 generally represents any group or cluster of indicators that correspond to network ports on a network device. In one example, port-status indicator array 104 may include an indicator for each network port on a network device. In other words, the number of indicators within port-status indicator array 104 may directly correspond to or match the number of network ports on a network device. In addition, each indicator within port-status indicator array 104 may represent and/or may be assigned to a specific network port.

Link-status indicator array 106 generally represents any group or cluster of indicators that correspond to network links on a network device. In contrast to port-status indicator array 104, link-status indicator array 106 may not include an indicator that corresponds to each network link on a network device. Instead, the indicators within link-status indicator array 106 may be dynamically assigned to represent a particular network link within a network port. For example, each indicator within link-status indicator array 106 may correspond to a network link lane. The term "network link lane," as used herein, generally refers to any logical association, label, or identification of a network link within a network port.

In some examples, individual network links within each network port on a network device may be defined and/or identified by a lane number. As an example, a network device with network ports that each facilitate four network links may label the network links within each network port as network link lanes 0-3. In some embodiments, the number of indicators within link-status indicator array 106 may correspond to the highest number of network links facilitated by an individual network port on a network device.

As illustrated in FIG. 1, apparatus 100 may also include one or more physical processing devices, such as physical processing device 108. Physical processing device 108 generally represents any type or form of hardware-implemented computing device capable of interpreting and/or executing computer-readable instructions. In one example, physical processing device 108 may direct port-status indicator array 104 and/or link-status indicator array 106 to indicate statuses of network links on a network device. Examples of physical processing device 108 include, without limitation, microprocessors, microcontrollers, CPUs, GPUs, Field-Programmable Gate Arrays (FPGAs) that implement softcore processors, Application-Specific Integrated Circuits (ASICs), portions of one or more of the same, variations or combinations of one or more of the same, and/or any other suitable physical processing device.

Exemplary apparatus 100 in FIG. 1 may be implemented in a variety of ways. For example, all or a portion of exemplary apparatus 100 may represent portions of exemplary implementation 200 in FIG. 2. As shown in FIG. 2, implementation 200 may include computing devices 206(1)-(N) in communication with a network device 202 via a network 204. As will be explained in greater detail below, apparatus 100 may indicate the statuses of network ports and/or network links used to facilitate communication between network device 202 and computing devices 206(1)-(N).

Computing devices 206(1)-(N) generally represent any type or form of computing devices capable of reading computer-executable instructions. In one example, computing devices 206(1)-(N) may include and/or represent client devices and/or end-user devices. Additional examples of computing devices 206(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, network devices, routers, switches, gateways, firewalls, variations or combinations of one or more of the same, and/or any other suitable computing devices.

Network device 202 generally represents any type or form of computing device that forwards traffic within a network and/or across networks. Examples of network device 202 include, without limitation, optical transceivers, routers, switches, hubs, modems, bridges, repeaters, gateways, load balancers, multiplexer, network adapters, servers, client devices, portions of one or more of the same, variations or combinations of one or more of the same, and/or any other suitable network device.

Network 204 generally represents any medium or architecture capable of facilitating communication or data transfer. In one example, network 204 may include computing devices 206(1)-(N) and apparatus 100 and/or facilitate communication between computing devices 206(1)-(N) and apparatus 100. In this example, network 204 may facilitate communication or data transfer using wireless and/or wired connections. Examples of network 204 include, without limitation, fiber optic cables, an intranet, a Wide Area Network (WAN), a Local Area Network (LAN), an enterprise network, a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, network device 202 and/or computing devices 206(1)-(N) may alternatively be included in and/or represent part of network 204.

Figure 3:
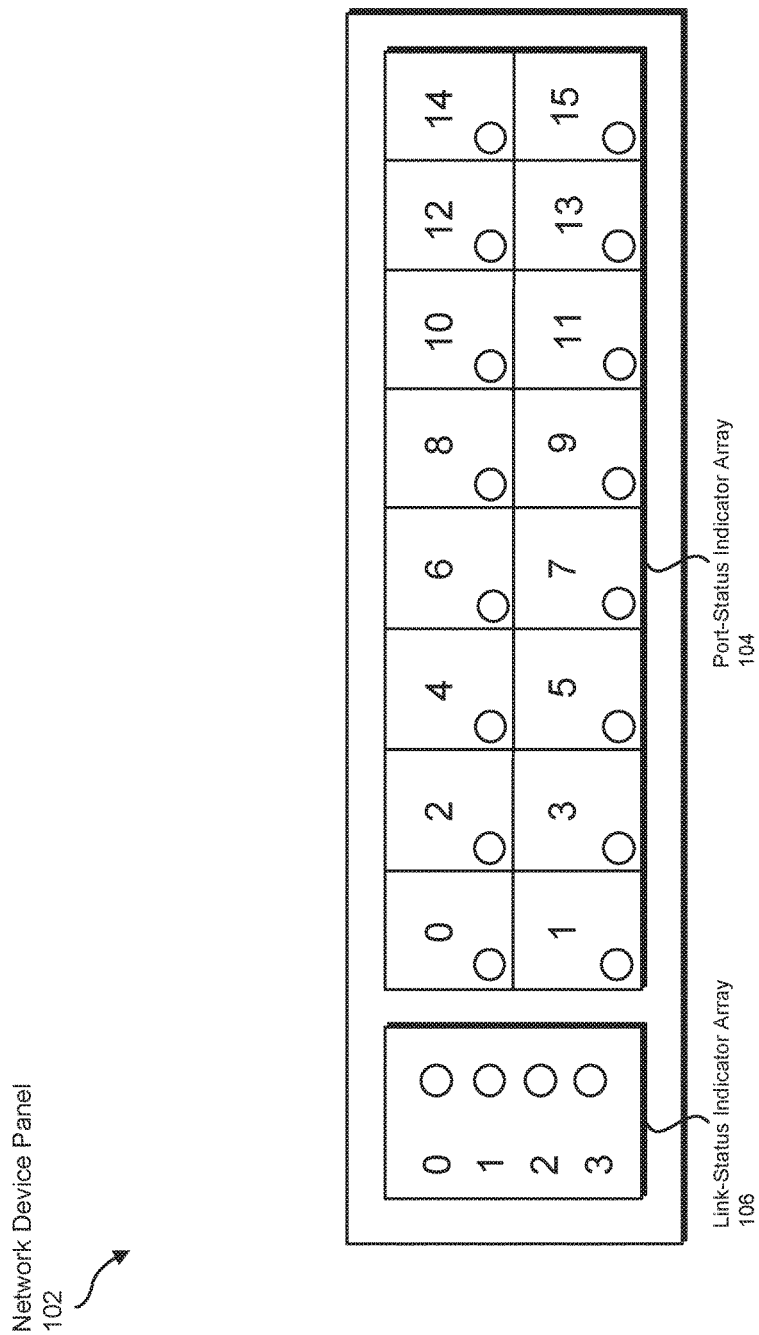
FIG. 3 is an illustration of an exemplary network device panel.

FIG. 3 illustrates an exemplary configuration of port-status indicator array 104 and link-status indicator array 106 within network device panel 102 of network device 202. In this example, network device 202 may include 16 network ports. In addition, each of these network ports may facilitate up to 4 network links. Accordingly, as shown in FIG. 3, port-status indicator array 104 may include 16 indicators that each correspond to a specific network port (i.e., network ports 0-15). In addition, link-status indicator array 106 may include 4 indicators that each correspond to a network link lane (i.e., network link lanes 0-3).

In some examples, physical processing device 108 may direct port-status indicator array 104 and/or link-status indicator array 106 to indicate a status of one or more network links facilitated by network device 202. In one embodiment, physical processing device 108 may direct arrays 104 and 106 to simultaneously indicate the status of each network link facilitated by a specific network port. For example, physical processing device 108 may direct the indicators within link-status indicator array 106 to visually indicate the status of each network link lane within the specific network port. In addition, physical processing device 108 may direct port-status indicator array 104 to indicate or identify the specific network port whose network links are currently described by link-status indicator array 106. In this way, a user viewing network device 202 may clearly and efficiently determine the status of each network link facilitated by the specific network port.

In some embodiments, physical processing device 108 may direct port-status indicator array 104 and link-status indicator array 106 to indicate the status of all or a portion of the network links facilitated by network device 202. For example, physical processing device 108 may direct arrays 104 and 106 to automatically and/or periodically cycle through each network port within network device 202, indicating the statuses of the network links facilitated by each network port in turn.

Figure 4:
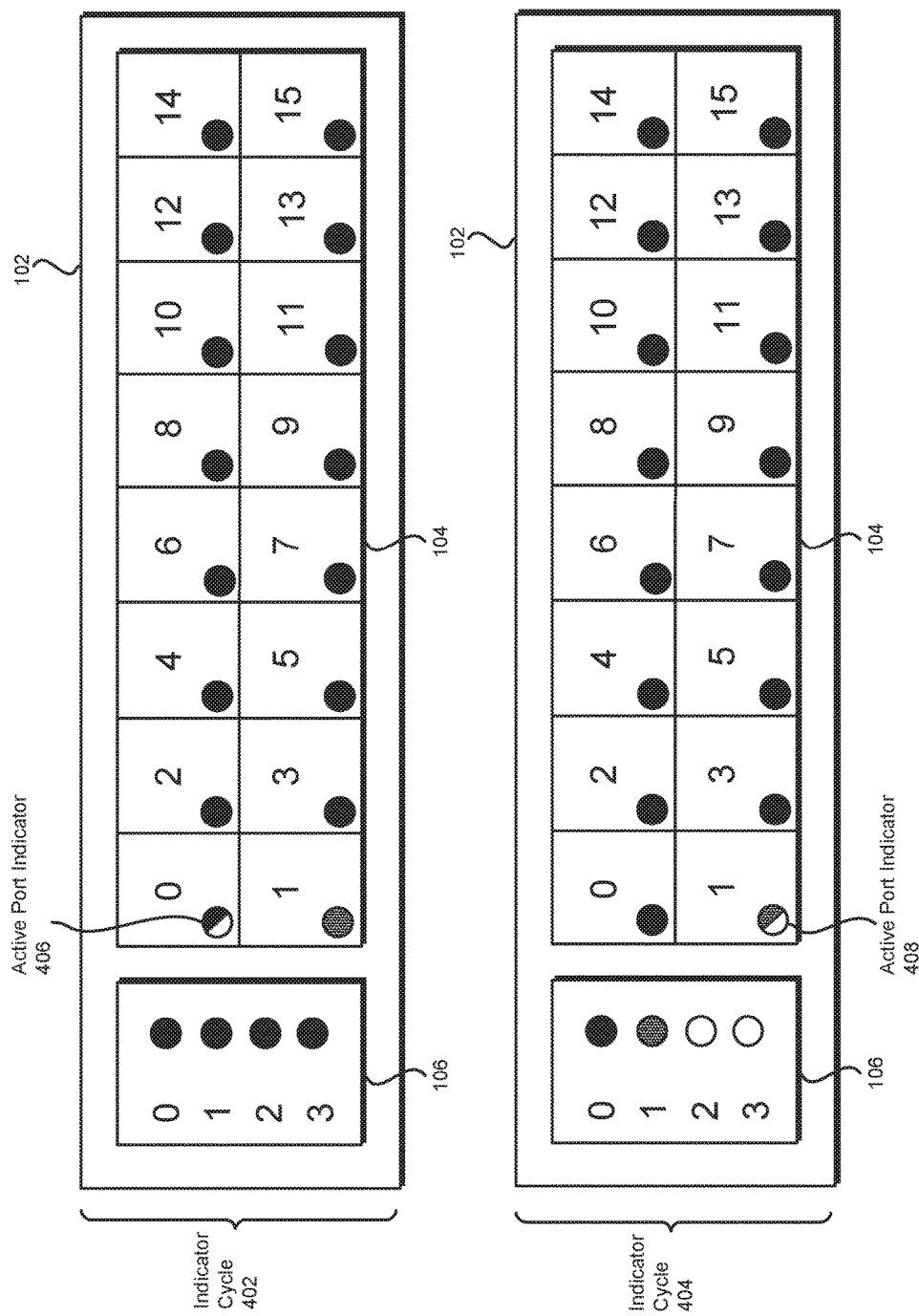
FIG. 4 is an illustration of exemplary configurations of a network device panel.

As an example of such a cycling process, FIG. 4 illustrates an indicator cycle 402 and an indicator cycle 404. In this example, filled (e.g., solidly-colored) indicators may represent indicators that are currently indicating functional network links. In particular, filled indicators may represent LEDs that are currently displaying light in a color associated with functional network links. In addition, shaded indicators may represent indicators that are currently indicating non-functional network links (e.g., LEDs that are currently displaying light in a color associated with non-functional network links). Furthermore, unfilled (e.g., uncolored) indicators may indicate non-existent and/or disabled network links. In some examples, a half-filled indicator may represent an active indicator that is indicating or identifying a network port whose network links are currently described by link-status indicator array 106. In one embodiment, a half-filled indicator may indicate that one or more LEDs within the indicator are flashing or blinking.

In the example of FIG. 4, indicator cycle 402 may visually indicate the status of each network link facilitated by network port 0 within network device 202. In this example, network port 0 may facilitate 4 network links (i.e., network links corresponding to network link lanes 0-3), and each network link may be functional. Accordingly, physical processing device 108 may direct each indicator within link-status indicator array 106 to indicate a functional network link. In addition, physical processing device 108 may direct the indicator corresponding to network port 0 within port-status indicator array 104 to flash or otherwise indicate that network port 0 is the network port whose network links are currently described by link-status indicator array 106. As shown in FIG. 4, this indicator may represent an active port indicator 406.

In some examples, physical processing device 108 may direct each additional indicator within port-status indicator array 104 to indicate the overall or cumulative status of the additional network ports. For example, physical processing device 108 may direct each indicator representing a network port whose network links are all functional to operate in a mode associated with functional network links. Physical processing device 108 may also direct each indicator representing network ports that facilitate one or more non-functional network links to operate in a mode associated with non-functional links. As illustrated within indicator cycle 402, port-status indicator array 104 may indicate that every network link facilitated by network ports 2-15 is functional and that network port 1 has at least one network link that is currently non-functional.

In one embodiment, physical processing device 108 may direct port-status indicator array 104 and link-status indicator array 106 to display indicator cycle 402 for a predetermined amount of time (e.g., 15 seconds, 30 seconds, etc.). This predetermined time period may be set or defined by a user and/or administrator of network device 202. In some examples, after this time period has lapsed, physical processing device 108 may direct arrays 104 and 106 to indicate the status of network links facilitated by another network port on network device 202.

Continuing with the example of FIG. 4, physical processing device 108 may direct arrays 104 and 106 to describe the status of each network link facilitated by network port 1 (illustrated by indicator cycle 404). As illustrated by indicator cycle 404, network port 1 may facilitate two networks links (i.e., corresponding to network link lane 0 and network link lane 1). In this example, network link lane 0 of network port 1 may be functional, while network link lane 1 may be non-functional. Accordingly, physical processing device 108 may direct the link-status indicator corresponding to network link lane 0 to indicate a functional network link and the link-status indicator corresponding to network link lane 1 to indicate a non-functional network link. Physical processing device 108 may also direct link-status indicator array 106 to turn off or disable the remaining link-status indicators to indicate that network port 1 does not facilitate and/or have any network links in lane numbers 2 and 3. In addition, physical processing device 108 may direct the port-status indicator corresponding to network port 1 to flash or otherwise indicate that network port 1 is the network port whose network links are currently described by link-status indicator array 106. As shown in FIG. 4, this indicator may represent an active port indicator 408.

In some examples, physical processing device 108 may direct port-status indicator array 104 and link-status indicator array 106 to continue to cycle through each network port within network device 202 until the status of each network link facilitated by network device 202 has been visually indicated. Physical processing device 108 may then perform any suitable action or enter any suitable operational mode, such as repeating the cycling process or waiting for direction and/or input from a user.

In addition to or instead of visually indicating the status of each network link facilitated by a specific network port, physical processing device 108 may direct arrays 104 and 106 to visually indicate the status of each network link that corresponds to a specific network link lane number. For example, physical processing device 108 may determine which network ports on network device 202 facilitate a network link that has been labeled with or assigned to a specific network link lane number and then direct port-status indicator array 104 to indicate the status of each of these network links.

Figure 5:
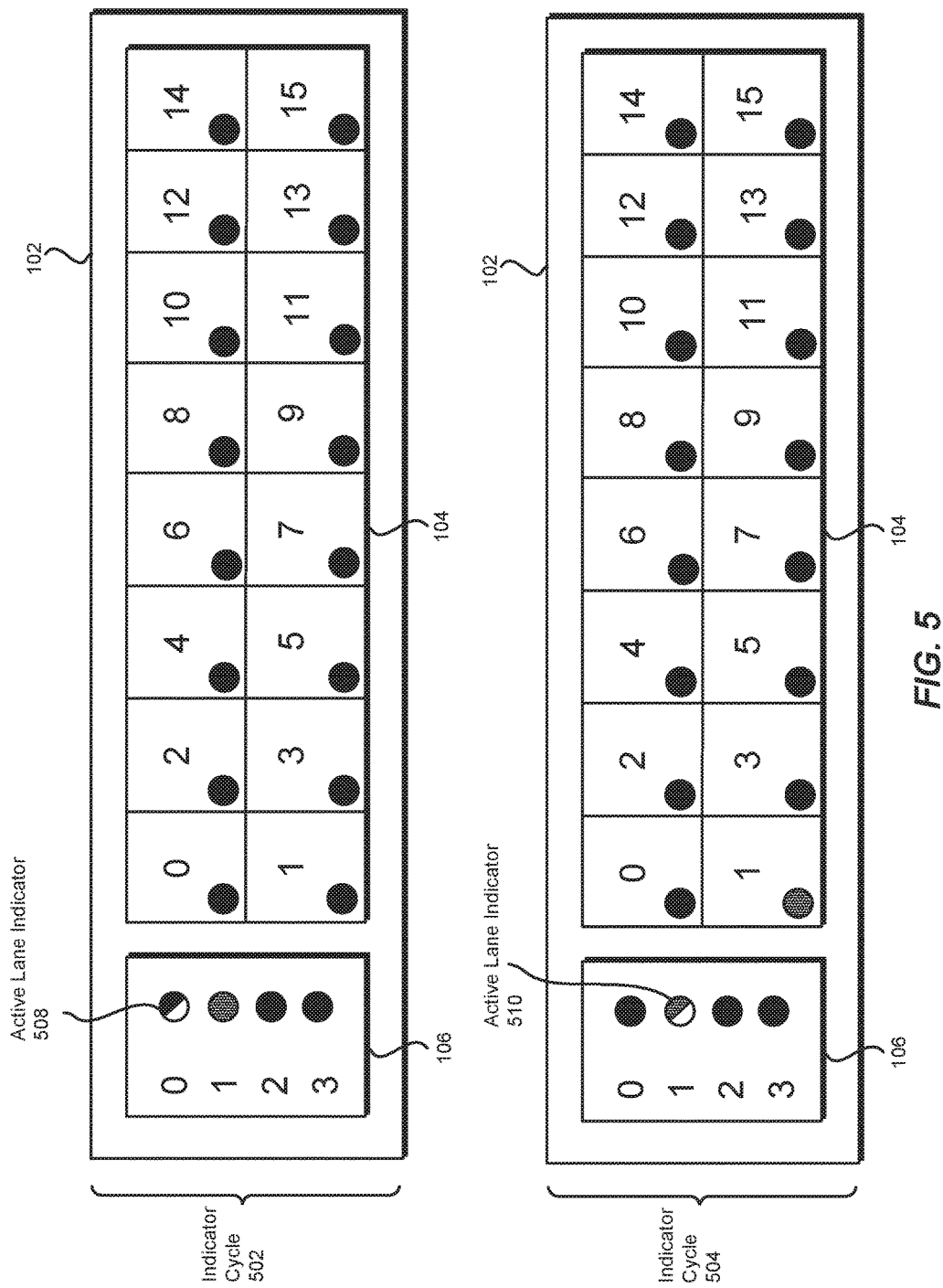
FIG. 5 is an illustration of additional exemplary configurations of a network device panel.

In some embodiments, physical processing device 108 may direct arrays 104 and 106 to automatically and/or periodically cycle through each network link lane of network ports facilitated by network device 202, indicating the statuses of the corresponding network links within each network port in turn. As an example of such a cycling process, FIG. 5 illustrates an indicator cycle 502 and an indicator cycle 504. As shown in FIG. 5, indicator cycle 502 may describe the status of each network link corresponding to network link lane 0 within network device 202. In this example, each of network ports 0-15 may facilitate a network link corresponding to lane 0, and each of these network links may be functional. Accordingly, physical processing device 108 may direct each indicator within port-status indicator array 104 to indicate a functional network link.

In this example, the indicator corresponding to network link lane 0 within link-status indicator array 106 may represent an active lane indicator 508. Accordingly, in the example of FIG. 5, physical processing device 108 may direct this indicator to flash or otherwise indicate that network link lane 0 is the current active network link lane number. In other examples, physical processing device 108 may indicate that lane 0 is the current active lane number by directing the corresponding indicator to remain on (e.g., not flash), while disabling or turning off the remaining link-status indicators.

In one embodiment, physical processing device 108 may direct arrays 104 and 106 to display indicator cycle 502 for a predetermined amount of time (e.g., 15 seconds, 30 seconds, etc.). After this predetermined time period, physical processing device 108 may direct arrays 104 and 106 to indicate the status of network links associated with another network link lane number. Continuing with the example of FIG. 5, physical processing device 108 may direct arrays 104 and 106 to describe the status of each network link that corresponds to network link lane 1 (illustrated by indicator cycle 504).

As illustrated by indicator cycle 504, each network port within network device 202 may facilitate a network link corresponding to network link lane 1. In this example, network links corresponding to lane 1 facilitated by network ports 0 and 2-15 may be functional. In addition, the network link corresponding to lane 1 facilitated by network port 1 may be non-functional. Accordingly, physical processing device 108 may direct each port-status indicator corresponding to network ports 0 and 2-15 to indicate a functional network link and direct the port-status indicator corresponding to network port 1 to indicate a non-functional network link. In addition, physical processing device 108 may direct the indicator corresponding to network link lane 1 within link-status indicator array 106 to represent an active lane indicator 510.

In some examples, physical processing device 108 may direct arrays 104 and 106 to continue to cycle through each network link lane facilitated by network ports of network device 202 until the status of each network link facilitated by network device 202 has been visually indicated. Physical processing device 108 may then perform any suitable action or enter any suitable operational mode, such as repeating the cycling process or waiting for direction and/or input from a user.

In some embodiments, physical processing device 108 may direct arrays 104 and 106 to indicate the status of one or more network links in response to direction or input from a user of network device 202. For example, a user and/or administrator that operates or utilizes network device 202 may prompt physical processing device 108 to visually indicate the status of network links corresponding to a specific network port and/or specific network link lane. A user may provide such input via any suitable mechanism or technique, such as by entering one or more computer-executable instructions to physical processing device 108 and/or manually pressing a button or similar device corresponding to a particular network link lane or network port. In one embodiment, network device panel 102 on network device 202 may include a user interface that enables a user to efficiently provide physical processing device 108 with requests or instructions.

In some examples, arrays 104 and 106 may operate in a static or constant state (e.g., as opposed to a dynamically-cycling mode, as discussed in connection with FIGS. 4 and 5) while waiting to receive input from a user. Such a state may visually indicate the overall or cumulative status of network links within each network port and/or corresponding to each network link lane. In other words, this state may indicate whether network device 202 currently has any non-functional network links, but may not indicate the status of any specific network link.

Figure 6:
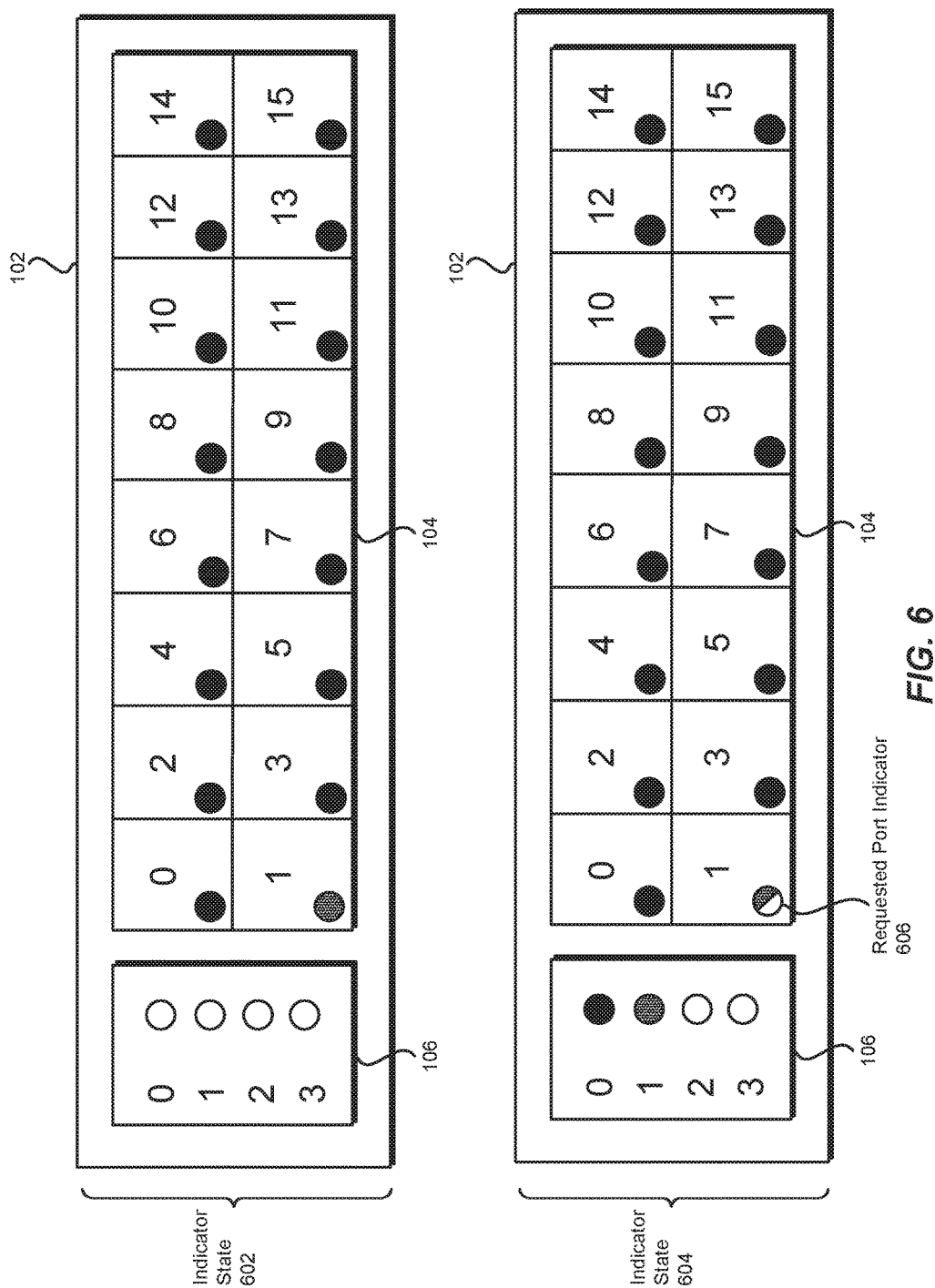
FIG. 6 is an illustration of additional exemplary configurations of a network device panel.

As an example of a static indicator state, FIG. 6 illustrates an indicator state 602. In this example, physical processing device 108 may direct port-status indicator array 104 to indicate the overall status of each network port on network device 202. As shown in FIG. 6, indicator state 602 may indicate that each network link facilitated by network ports 0 and 2-15 is functional and that network port 1 facilitates at least one currently non-functional network link. In addition, physical processing device 108 may direct link-status indicator array 106 to disable or turn off each link-status indicator. In alternative embodiments, physical processing device 108 may direct link-status indicator array 106 to indicate the overall status of network links corresponding to each network link lane number and direct port-status indicator array 104 to disable or turn off each port-status indicator.

In some examples, arrays 104 and 106 may operate in indicator state 602 until physical processing device 108 receives a request for network device 202 to visually indicate the status of one or more network links. In the example of FIG. 6, physical processing device 108 may receive a request from a user to view the status of each network link facilitated by network port 1. In response to this request, physical processing device 108 may direct arrays 104 and 106 to operate in an indicator state 604. As shown in FIG. 6, indicator state 604 may indicate that network link lane 0 of network port 1 is functional and network link lane 1 of network port 1 is non-functional. In addition, physical processing device 108 may direct the port-status indicator corresponding to network port 1 to flash or otherwise indicate that the network links facilitated by network port 1 are currently described by link-status indicator array 106. As shown in FIG. 6, this indicator may represent a requested port indicator 606. In some embodiments, physical processing device 108 may direct arrays 104 and 106 to display indicator state 604 for a predetermined amount of time before returning to indicator state 602 and/or until receiving an additional request.

As explained above in connection with FIGS. 4-6, physical processing device 108 may efficiently and clearly indicate the status of all or a portion of the network links facilitated by network device 202. Rather than utilizing a separate indicator to represent each individual network link facilitated by network device 202, physical processing device 108 may indicate the status of a specific network link using an indicator corresponding to the network port that facilitates the network link and an indicator corresponding to the lane number of the network link. In this way, the number of indicators required to visually indicate the status of each network link of network device 202 may be significantly less than the number of indicators required by traditional indicator configurations and/or schemes.

Figure 7:
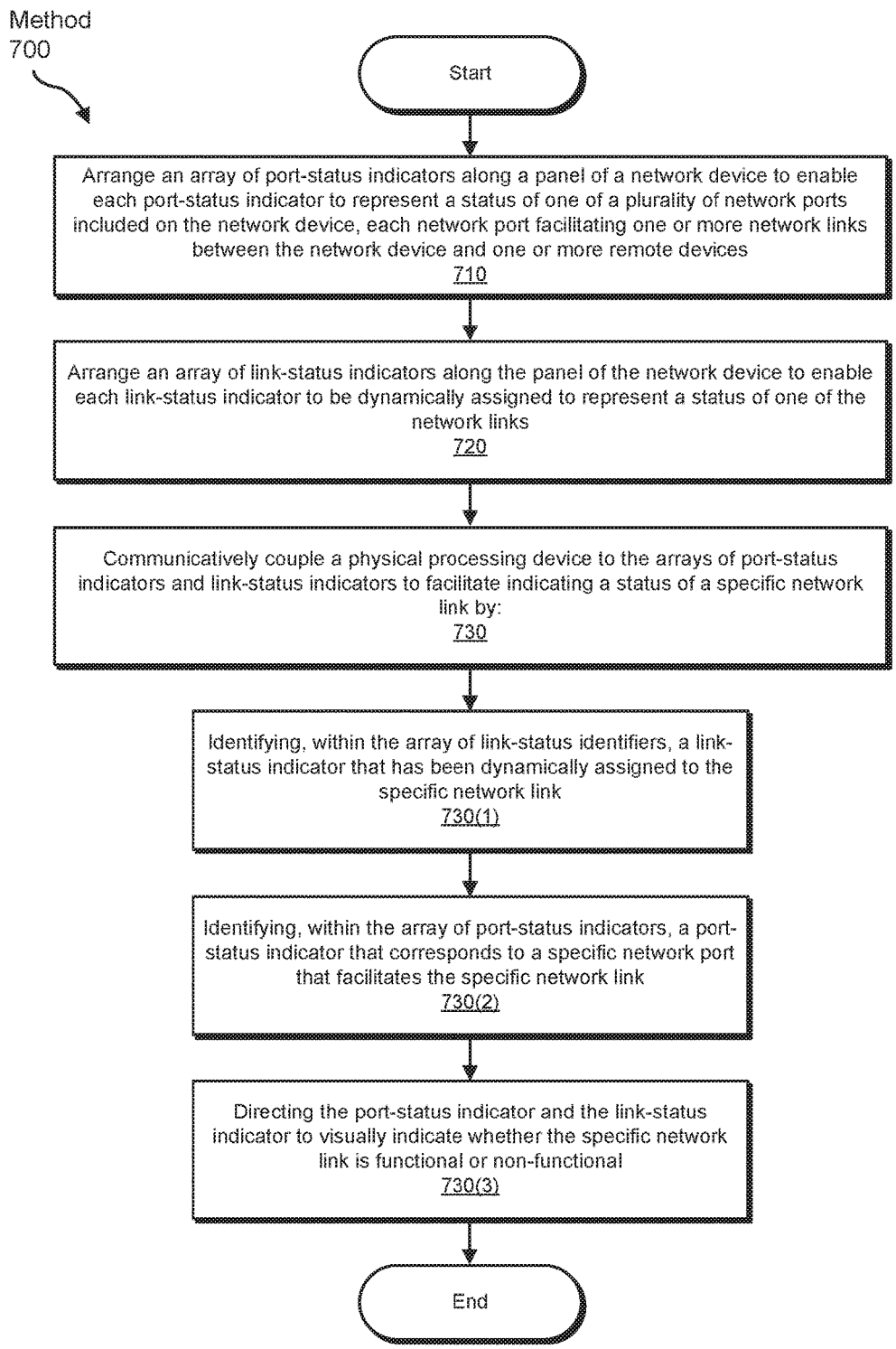
FIG. 7 is a flow diagram of an exemplary method for indicating statuses of multi-link network ports.

FIG. 7 is a flow diagram of an exemplary method 700 for indicating statuses of multi-link network ports. Method 700 may include the step of arranging an array of port-status indicators along a panel of a network device to enable each port-status indicator to represent a status of one of multiple network ports included on the network device, each network port facilitating one or more network links between the network device and one or more remote devices (710). This arranging step may be performed in a variety of ways. In one example, a telecommunications equipment manufacturer may manufacture and/or build a panel that attaches to the enclosure of a network device. In this example, the telecommunications equipment manufacturer may design and/or organize an array of port-status indicators along the panel. By doing so, the telecommunications equipment manufacturer may enable each port-status indicator to represent the status of a certain network port on the network device.

In some examples, method 700 may also include the step of arranging an array of link-status indicators along the panel of the network device to enable each link-status indicator to be dynamically assigned to represent a status of one of the network links (720). This arranging step may be performed in a variety of ways. In one example, a telecommunications equipment manufacturer may design and/or organize an array of link-status indicators along a panel that attaches to the enclosure of a network device. Specifically, the telecommunications equipment manufacturer may position this array of link-status indicators to be adjacent to an array of port-status indicators that are also arranged on the network device panel. By doing so, the telecommunications equipment manufacturer may enable each link-status indicator to be dynamically assigned to represent the status of a certain network link that is facilitated by a network port on the network device.

In some examples, method 700 may further include the step of communicatively coupling a physical processing device to the arrays of port-status indicators and link-status indicators to facilitate indicating a status of a specific network link (730). In one example, the physical processing device may identify, within the array of link-status identifiers, a link-status indicator that has been dynamically assigned to the specific network link (730(1)). The physical processing device may also identify, within the array of port-status indicators, a port-status indicator that corresponds to the specific network port (730(2)). Next, the physical processing device may direct the port-status indicator and the link-status indicator to visually indicate whether the specific network link is functional or non-functional (730(3)). In one embodiment, a telecommunications equipment manufacturer may couple the physical processing device to the arrays of port-status indicators and link-status indicators during and/or after arranging the arrays of port-status indicators and link-status indicators on a network device.

These steps may be performed in a variety of ways. In one embodiment, a physical processing device may direct a port-status indicator array and a link-status indicator array to simultaneously indicate the status of each network link facilitated by a specific network port. Alternatively, the physical processing device may direct the port-status indicator array and the link-status indicator array to simultaneously indicate the status of each network link that has the same network link lane number as a specific network link. In some examples, the physical processing device may perform such a process automatically. Specifically, the physical processing device may direct the port-status indicator array and the link-status indicator array to periodically cycle through each network port and/or network link lane, displaying the statuses of each corresponding network link in turn. In other examples, the physical processing device may perform this process in response to input or direction from a user.

Figure 8:
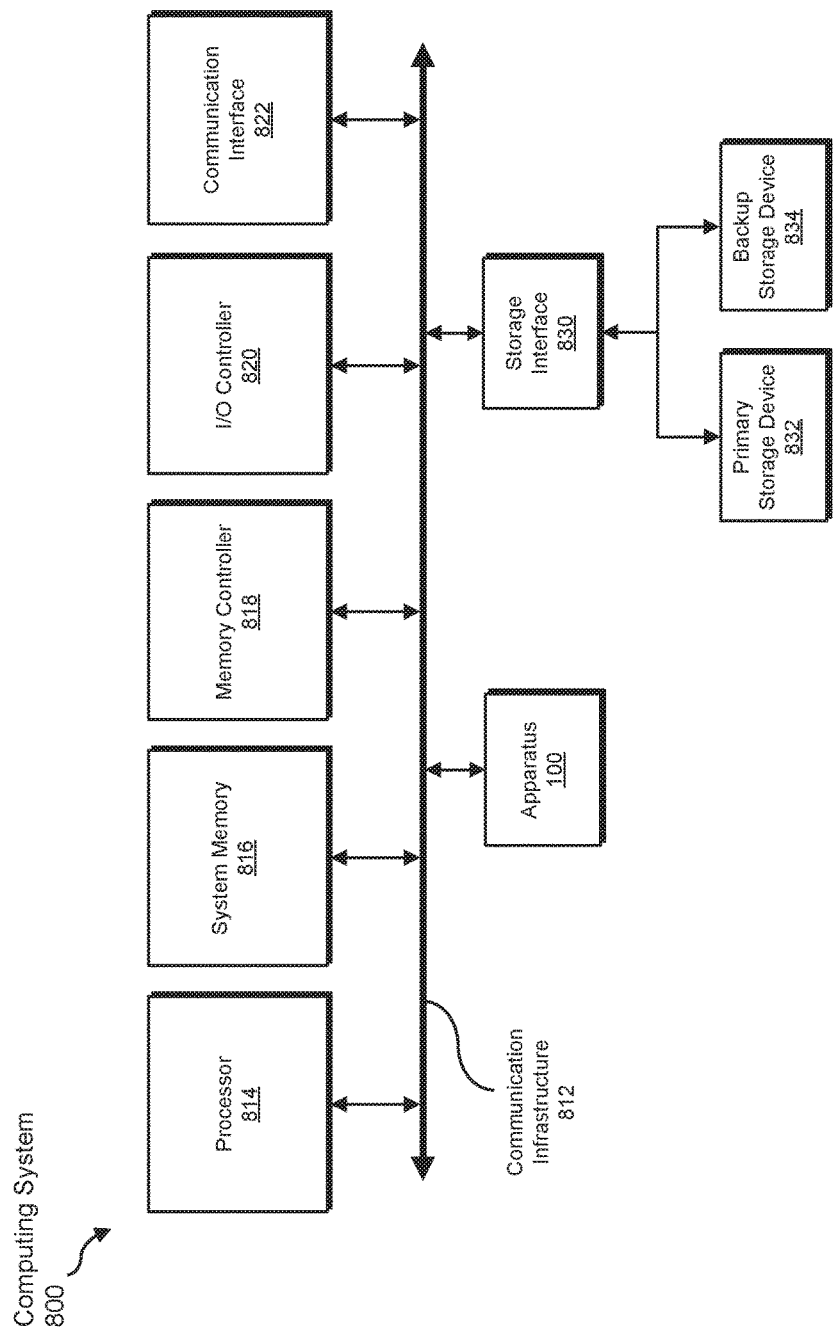
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 7. All or a portion of computing system 800 may also perform and/or be a means for performing and/or implementing any other steps, methods, or processes described and/or illustrated herein. In one example, computing system 800 may include apparatus 100 from FIG. 1.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a panel coupled to a network device that includes a plurality of network ports that each facilitate one or more network links between the network device and one or more remote devices, the panel comprising:
        an array of port-status indicators that each represent a status of one of the network ports on the network device; and
        an array of link-status indicators that are each dynamically assigned to represent a status of one of the network links; and
    at least one physical processing device communicatively coupled to the arrays of port-status indicators and link-status indicators, wherein the physical processing device:
        identifies, within the array of link-status indicators, a link-status indicator that has been dynamically assigned to a specific network link;
        identifies, within the array of port-status indicators, a port-status indicator that corresponds to a specific network port that facilitates the specific network link; and
        directs the port-status indicator and the link-status indicator to visually indicate whether the specific network link is functional or non-functional.

2. The apparatus of claim 1, wherein the port-status indicators and the link-status indicators comprise Light-Emitting Diodes (LEDs) that:
    visually indicate a functional network link by displaying light in a first color; and
    visually indicate a non-functional network link by displaying light in a second color.

3. The apparatus of claim 1, wherein the physical processing device further directs the array of link-status indicators to simultaneously indicate whether each network link facilitated by the specific network port is functional or non-functional.

4. The apparatus of claim 3, wherein the physical processing device directs the port-status indicator that corresponds to the specific network port to visually indicate that the specific network port represents an active network port whose network links are currently described by the array of link-status indicators.

5. The apparatus of claim 4, wherein the physical processing device further directs the arrays of port-status indicators and link-status indicators to visually indicate whether each network link facilitated by the network device is functional or non-functional.

6. The apparatus of claim 5, wherein:
    the array of link-status indicators visually indicates whether each network link facilitated by the specific network port is functional or non-functional for a predetermined amount of time;
    the array of port-status indicators visually indicates that the specific network port is the active network port for the predetermined amount of time; and
    after the predetermined amount of time, the arrays of link-status indicators and port-status indicators automatically cycle to describe another network port.

7. The apparatus of claim 1, wherein the link-status indicator that has been dynamically assigned to the specific network link corresponds to a lane number of the specific network link in connection with the specific network port, wherein one or more additional network ports facilitate a network link with the same lane number.

8. The apparatus of claim 7, wherein the physical processing device:
    directs the array of port-status indicators to simultaneously indicate whether each network link with the same lane number is functional or non-functional; and
    directs the array of link-status indicators to indicate that the lane number is an active lane number whose corresponding network links facilitated by the network ports are currently described by the array of port-status indicators.

9. The apparatus of claim 1, wherein the physical processing device:
    receives a request for the network device to visually indicate whether the specific network link is functional or non-functional; and
    directs the port-status indicator and the link-status indicator to visually indicate whether the network link is functional or non-functional in response to the request.

10. A network device comprising:
    a panel that includes a plurality of network ports that each facilitate one or more network links between the network device and one or more remote devices, the panel comprising:
        an array of port-status indicators that each represent a status of one of the network ports on the network device; and
        an array of link-status indicators that are each dynamically assigned to represent a status of one of the network links; and at least one physical processing device communicatively coupled to the arrays of port-status indicators and link-status indicators, wherein the physical processing device:
    identifies, within the array of link-status indicators, a link-status indicator that has been dynamically assigned to a specific network link;
    identifies, within the array of port-status indicators, a port-status indicator that corresponds to a specific network port that facilitates the specific network link; and
    directs the port-status indicator and the link-status indicator to visually indicate whether the specific network link is functional or non-functional.

11. The network device of claim 10, wherein the port-status indicators and the link-status indicators comprise LEDs that:
    visually indicate a functional network link by displaying light in a first color; and
    visually indicate a non-functional network link by displaying light in a second color.

12. The network device of claim 10, wherein the physical processing device further directs the array of link-status indicators to simultaneously indicate whether each network link facilitated by the specific network port is functional or non-functional.

13. The network device of claim 12, wherein the physical processing device directs the port-status indicator that corresponds to the specific network port to visually indicate that the specific network port represents an active network port whose network links are currently described by the array of link-status indicators.

14. The network device of claim 13, wherein the physical processing device further directs the arrays of port-status indicators and link-status indicators to visually indicate whether each network link facilitated by the network device is functional or non-functional.

15. The network device of claim 14, wherein:
    the array of link-status indicators visually indicates whether each network link facilitated by the specific network port is functional or non-functional for a predetermined amount of time;
    the array of port-status indicators visually indicates that the specific network port is the active network port for the predetermined amount of time; and
    after the predetermined amount of time, the arrays of link-status indicators and port-status indicators automatically cycle to describe another network port.

16. The network device of claim 10, wherein the link-status indicator that has been dynamically assigned to the specific network link corresponds to a lane number of the specific network link in connection with the specific network port, wherein one or more additional network ports facilitate a network link with the same lane number.

17. The network device of claim 16, wherein the physical processing device:
    directs the array of port-status indicators to simultaneously indicate whether each network link with the same lane number is functional or non-functional; and
    directs the array of link-status indicators to indicate that the lane number is an active lane number whose corresponding network links facilitated by the network ports are currently described by the array of port-status indicators.

18. The network device of claim 10, wherein the physical processing device:
    receives a request for the network device to visually indicate whether the specific network link is functional or non-functional; and
    directs the port-status indicator and the link-status indicator to visually indicate whether the network link is functional or non-functional in response to the request.

19. A method comprising:
    arranging an array of port-status indicators along a panel of a network device to enable each port-status indicator to represent a status of one of a plurality of network ports included on the network device, each network port facilitating one or more network links between the network device and one or more remote devices;
    arranging an array of link-status indicators along the panel of the network device to enable each link-status indicator to be dynamically assigned to represent a status of one of the network links; and
    communicatively coupling a physical processing device to the arrays of port-status indicators and link-status indicators to facilitate indicating a status of a specific network link by:
        identifying, within the array of link-status indicators, a link-status indicator that has been dynamically assigned to the specific network link;
        identifying, within the array of port-status indicators, a port-status indicator that corresponds to a specific network port that facilitates the specific network link; and
        directing the port-status indicator and the link-status indicator to visually indicate whether the specific network link is functional or non-functional.

20. The method of claim 19, further comprising directing the array of link-status indicators to simultaneously indicate whether each network link facilitated by the specific network port is functional or non-functional.

* * * * *